United States Patent [19]

Dascalescu et al.

[11] 4,001,381

[45] Jan. 4, 1977

[54] MANUFACTURING PROCESS FOR HEAVY SODIUM CARBONATES IN BRIQUETTE FORM

[75] Inventors: Aurelian M. Dascalescu; Grigore O. Socolescu, both of Bucharest, Romania

[73] Assignee: Uzina De Produse Sodice, Ocna Mures, Romania

[22] Filed: July 20, 1973

[21] Appl. No.: 381,058

Related U.S. Application Data

[63] Continuation-in-part of Ser. No. 232,219, March 6, 1972, abandoned.

[30] Foreign Application Priority Data

Nov. 14, 1970 Romania .................................. 54918

[52] U.S. Cl. .................................. 423/426; 423/427
[51] Int. Cl.$^2$ .................................. C01D 7/37; C01D 7/38; C01D 7/12
[58] Field of Search .......... 423/419, 421, 422, 426, 423/427, 438, 425

[56] References Cited

UNITED STATES PATENTS

| | | | |
|---|---|---|---|
| 287,128 | 10/1883 | Hemji | 423/422 X |
| 338,924 | 3/1886 | Carson | 423/426 X |
| 2,012,587 | 8/1935 | Hunt | 423/438 X |
| 2,459,414 | 1/1949 | Carrier | 423/427 |
| 3,333,918 | 8/1967 | Gancy et al. | 423/426 |

FOREIGN PATENTS OR APPLICATIONS

| | | | |
|---|---|---|---|
| 3,713,457 | 1962 | Japan | 423/426 |
| 54,918 | 9/1972 | Romania | 423/421 |

*Primary Examiner*—Oscar R. Vertiz
*Assistant Examiner*—Gary P. Straub

[57] ABSTRACT

The invention is a heavy sodium carbonate -dense soda- in the form of briquettes, having great density, and includes also the commercial forms of heavy sodium carbonate in the form of powder, grains and briquettes, which products are obtained by grinding - or not as required - the briquettes. The invention also comprises a novel process which produces these briquettes by briquetting of the dry sodium bicarbonate from the SOLVAY or TRONA soda ash fabrication process, which after filtering or centrifuging and drying is briquetted at a pressure between 500 to 1000 kg/cm$^2$; the briquettes with a density of 1.8 kg/dm$^3$, are then introduced into a heated static space at 700° to 750° C., and maintained there until the bicarbonate briquettes turn into dense sodium carbonate briquettes, with a density of 2.2 - 2.4 kg/dm$^3$.

4 Claims, No Drawings

MANUFACTURING PROCESS FOR HEAVY SODIUM CARBONATES IN BRIQUETTE FORM

CROSS REFERENCE TO RELATED APPLICATION

This application is a continuation-in-part of copending, coassigned application Ser. No. 232,219, now abandoned, filed Mar. 6, 1972 entitled "Manufacturing Process for Heavy Sodium Carbonates and Products Produced Thereby."

This invention relates to a manufacturing process for briquettes of heavy sodium carbonate — dense soda — by simplified and economical technology and products produced by this technology, which products have a density between 1.0 to 2.4 $kg/dm^3$.

Industrial processes for the fabrication of heavy sodium carbonate (in bulk) with a bulk density of approx. 1.0 $kg/dm^3$ are already known.

One of these methods includes the classical SOLVAY or ammonia-soda process in which an ammoniated aqueous brine is reacted with carbon dioxide to form sodium bicarbonate crystals and these crystals are precipitated from solution and subsequently calcined to light sodium carbonate. This product is mixed with 25% water in a crystallizer, to obtain light monohydrate, at a temperature of 95° – 100° C. There then follows calcination of monohydrate at a temperature of 160° to 180° C., to form a more dense soda ash (U.S. Pat. No. 3,333,918).

By another method, the so-called "compacting method," anhydrous light sodium carbonate is compressed between two rotating cylinders at a pressure of 4800–5000 $kg/cm^2$ = 68.272 – 71.117 psi. The flakes of dense soda obtained are ground and sifted in order to obtain a predetermined granulation. The output efficiency does not exceed 60%.

A third method (GANCY - U.S. Pat. No. 3,333,918) starts from crude trona including a mixture of sodium sesquicarbonate ($Na_2CO_3 \cdot NaHCO_3 \cdot 2H_2O$) heating at 130° C. to form active light sodium carbonate. This active sodium carbonate is sintered at temperatures between 300° and 800° C., obtaining a sintered dense soda of 960 $Kg./m^3$ (or 60 lbs/cu.ft.).

The three methods are characterized by the utilization of an intermediate phase of light soda and only this light soda is transformed into dense soda and by subsequent treatments, by supplementary consumptions of mechanical and thermic energy.

The process according to the invention avoids the disadvantages of the above mentioned inventions, starting from SOLVAY type sodium bicarbonate as defined above, or from crude TRONA as defined above, dried to a 2 to 4% moisture content, briquetted and calcined, obtaining briquettes of calcined sodium carbonate with a density of 2.2–2.4 $kg/dm^3$.

The process according to the invention simplifies the classic method for dense sodium carbonate manufacture. It involves briquetting the dry starting substance at 500 to 1000 $kg/cm^2$ to a density of approx. 1.8 $kg/dm^3$; after this it is introduced into a heated space at 700° to 750° C. until the dense briquettes of the starting substance turn directly into briquettes of more dense sodium carbonate; meanwhile a self-contraction takes place, so that the volume of the briquette is reduced to one-half of its initial volume prior to this thermal treatment, having a unitary density of 2.2 to 2.4 $kg/dm^3$. This briquette of dense sodium carbonate may be marketed as such with a bulk density of 1.5 $kg/dm^3$, or may be ground to powder or granules of different sizes having a bulk density of 1.0 – 1.2 $kg/dm^3$.

It is known that sodium bicarbonate, when heated above 83° C., releases carbon dioxide and water vapor according to the following equation:

$$2NaHCO_3 \rightarrow Na_2CO_3 + H_2O + CO_2$$

In the gases there are also remnants of non-reacted $NH_3$ from the ammoniated aqueous brine, so that the gases resulting during the calcination in the process according to the invention, after drying contains $CO_2$ (98%) and $NH_3 + H_2O$ (2%) and are utilized in the following manner:

a. as heat carriers, to be recycled in the calcination retort; and b. as reaction agents to be fed back to the ammoniated aqueous brine for obtaining sodium bicarbonate in SOLVAY process.

The carbon dioxide constituent of such gases may also be utilized for manufacturing dry ice, or other uses.

In the step of briquette calcination, the combustion gases are not in direct contact with the briquettes and thus any carry over of powders is impossible, air pollution being completely avoided. Air pollution is also prevented in the subsequent technological steps, because the calcined briquettes are hard bodies which do not dust and do not release powders on manipulating.

An example of the application of the invention is given hereafter.

EXAMPLE

A sodium bicarbonate product, taken from a SOLVAY rotary vacuum filter, dried and containing 2–4% water is processed. There is used for the pressing a revolving briquetting press with a pressing space 38 mm. high. 32 g Sodium bicarbonate are introduced and pressed at 800 $kg/cm^2$ = 11,379 psi. The briquette is taken out without difficulty and has a density of approx. 1.8 $kg/dm^3$.

The briquette is introduced into a heated space at 700–750° C., for 15 minutes. Under the action of the heat the bicarbonate turns into dense carbonate. It is replaced with an emission of water vapor, carbon dioxide and ammonia, according to the following reaction:

$$2\ NaHCO_3 + NH_3 + H_2O \rightarrow Na_2CO_3 + CO_2 + {}_2H_2O + NH_3.$$

At the same time the material undergoes a contraction of its volume to approximately one-half of the initial volume. Density, because of the contraction, is 2.27 $kg/dm^3$.

In the same way the centrifuged bicarbonate may be processed; the processing can be carried out in any kind of special installation for this purpose.

According to the commercial use for the heavy sodium carbonate, the briquette can be ground by known techniques.

The advantages of the process include the following:

The soda briquettes or granules obtained have a high density and a high mechanical resistance. They may be conveyed as such in big containers, which reduce air pollution, handling and transport costs; the grinding may be carried out by the consumer in simple grinding mills.

Processing is carried out on a single phase; useless work for processing dense soda by two classic methods is avoided.

The caloric energy consumption is lower than for light soda calcination because of the low water content of the briquetted bicarbonate. Calcination may take place in smaller and better insulated devices; the heat losses, which are important in light soda calcination are reduced.

Energy consumption is lower, as simple equipment is used.

Powders are completely eliminated from the recovered gases; they can be recycled without purification. The powders in the calcination spaces of light soda are also eliminated and air pollution is completely avoided.

The process uses a series of simple equipment which is reliable in operation, such as classic briquetting revolving presses, mills, vibrating sieves and static calcinator, which are more efficient and economical.

What we claim is:

1. A process for the manufacture of heavy sodium carbonate briquettes, which comprises the steps of drying a raw, light sodium carbonate - forming starting substance selected from the group consisting of sodium bicarbonate and a mixture of sodium sesquicarbonate and sodium carbonate monohydrate to a 2–4% moisture content, subjecting the thus-dried starting substance to a pressure of about 800 kg/cm$^2$ to produce briquettes of the same starting substance having a density of approximately 1.8 kg/dm$^3$, and then calcining the thus-formed dense briquettes of the starting substance in a closed space heated to a temperature of 700°–750° C for a time period sufficient to convert the dense briquettes of said starting substance into briquettes of heavy sodium carbonate having a density of 2.2–2.4 kg/dm$^3$ and to simultaneously evolve a dust-free gas mixture of $CO_2$ and $H_2O$ vapors.

2. The process according to claim 1, wherein the starting substance is sodium bicarbonate, comprising the further step of recycling a portion of the resulting mixture of $CO_2$ and $H_2O$ through the closed space during the calcinating of the briquettes.

3. The process according to claim 1, comprising the further step of manufacturing the starting substance by reacting ammoniated aqueous brine with carbon dioxide, and recycling a portion of the mixture of $CO_2$ and $H_2O$ resulting from the calcining step to the ammoniated aqueous brine for use as a reaction agent during the manufacturing step.

4. The process according to claim 1, in which the starting substance is a mixture of sodium sesquicarbonate and sodium carbonate monohydrate, comprising the further steps of collecting and drying the resulting mixture of $CO_2$ and $H_2O$ for subsequent commercial use.

* * * * *